United States Patent
Saito

(10) Patent No.: US 7,178,856 B2
(45) Date of Patent: Feb. 20, 2007

(54) MOUNTING METHOD OF CLIP AND WEATHER STRIP

(75) Inventor: Katsushi Saito, Hiroshima (JP)

(73) Assignee: Nishikawa Rubber Co., Ltd., Hiroshima (JP)

(*) Notice: Subject to any disclaimer, the term of this patent is extended or adjusted under 35 U.S.C. 154(b) by 0 days.

(21) Appl. No.: 11/365,988

(22) Filed: Mar. 1, 2006

(65) Prior Publication Data

US 2006/0226676 A1 Oct. 12, 2006

(30) Foreign Application Priority Data

Apr. 11, 2005 (JP) ............... 2005-113541

(51) Int. Cl.
E06B 7/16 (2006.01)
B60J 10/08 (2006.01)
(52) U.S. Cl. ............... 296/146.9; 49/493.1
(58) Field of Classification Search ......... 296/146.1, 296/146.9; 24/289, 292, 293, 297; 49/475.1, 49/490.1, 492.1, 493.1
See application file for complete search history.

(56) References Cited

U.S. PATENT DOCUMENTS 2,554,452 A * 5/1951 Bright .................. 49/490.1
3,074,134 A * 1/1963 Buechler ................ 24/289
4,864,774 A * 9/1989 Onishi et al. ............ 49/440
6,848,218 B2 * 2/2005 Langemann ........... 49/495.1

FOREIGN PATENT DOCUMENTS

GB 2266742 A * 11/1993 ............ 296/146.9
JP 05-310084 A 11/1993

* cited by examiner

Primary Examiner—D. Glenn Dayoan
Assistant Examiner—Paul Chenevert
(74) Attorney, Agent, or Firm—Frishauf, Holtz, Goodman & Chick, P.C.

(57) ABSTRACT

There is provided a clip 30 for mounting an installation base member 22 of a weather strip 20 on a flange 100 provided along a body of an automobile, wherein said clip 30 is composed of a fixing piece 31 mounted on an exposed end portion of a resin insert 24 embedded in the installation base member 22 of said weather strip 20; and a pressuring piece 32 which is rotatably mounted to the fixing piece 31, approaches one side surface of said flange 100 by the rotation to make an elastic contact, and holds said flange 100 with an installation surface of said installation base member 22 mounted on the other side surface of said flange 100.

14 Claims, 11 Drawing Sheets

US 7,178,856 B2

MOUNTING METHOD OF CLIP AND WEATHER STRIP

BACKGROUND OF THE INVENTION

The present invention relates to a mounting method of a clip for mounting an installation base member of a weather strip on a flange provided along a body of an automobile and a mounting method of the weather strip using the clip.

In mounting a weather strip 10 on a flange 100 provided along a body of an automobile, in usual, plural protuberances 13 are formed inside sidewalls of a cross-section roughly U-shaped installation base member 12 with which a hollow seal member 11 is integrally molded so that a flange 100 is held making use of elasticity of the protuberances 13 as shown in FIG. 17. In addition, a core metal 14 which also roughly forms U shape in section is embedded inside the installation base member 12 in order to improve holding force of the protuberances 13 toward the flange 100. Cabin side of the installation base member 12 is covered with an interior material 15.

Generally, thickness of the flange 100 is not even and the thickness may continually vary including thick portions and thin portions, therefore, the holding force of the protuberances 13 and the core metal 14 can not sufficiently deal with variety of the thickness. In this connection, length of the protuberances 13 is varied at the time of extrusion-molding as shown in FIG. 18: the protuberances 13 are shortened where the flange is thick whereas the protuberances 13 are lengthened where the flange is thin.

But the above-mentioned extrusion-molding of the partially altered weather strip 10 depending on the thickness of the flange 100 is complicated. In addition, there may remain parts on the weather strip which do not sufficiently correspond to the shape of the flange 100. Further, the extrusion-molding of the cross-section roughly U-shaped installation base member 12 does not satisfy the recent demands for weight saving of the weather strip 10. Especially, when the core metal 14 is used, the weight of the weather strip further increases and the demands for recycling are not satisfied.

Therefore, the inventors of the present invention have invented the mounting of the weather strip 10 on the flange 100 by means of a clip.

The invention of mounting the interior part depending on the thickness of the flange by means of the clip is disclosed, for example, in the Japanese unexamined Patent Publication No. H05-310084.

The invention shown in the Japanese unexamined Patent Publication No. H05-310084, however, is directed to the mounting of a garnish as the interior part on the flange by means of the clip so as to reduce a clearance, therefore, is different from the invention of mounting the weather strip. Thus, the above-mentioned Publication does not disclose the weight saving of the weather strip.

In addition, the clip disclosed in the Japanese unexamined Patent Publication No. H05-310084 is provided with a first holding part to hold the garnish and a second holding part to hold the flange thereby forming cross-section roughly S-shape. The second holding part wraps a top end of the flange, covers both sides of the flange, and has 3 protuberances (elastic projections) having respective degrees of bend. Therefore, the clip is complicated in structure and is difficult to mount.

Therefore, an object of the present invention is to provide the clip which enables to mount the installation base member of the weather strip easily on the flange provided along the body of the automobile attempting the weight saving and to provide the mounting method of the weather strip using the clip.

SUMMARY OF THE INVENTION

In order to achieve the above-mentioned object, a first aspect of the invention provides a clip for mounting an installation base member of a weather strip on a flange provided along a body of an automobile, wherein said clip is composed of a fixing piece mounted on an installation base member of said weather strip; and a pressuring piece which is rotatably or movably mounted to the fixing piece, approaches one side surface of said flange by the rotation or the movement to make an elastic contact, and holds said flange with an installation surface of said installation base member mounted on the other side surface of said flange.

A second aspect of the invention provides a clip, wherein said installation base member roughly forms L shape in section including: one part formed along the other side surface of said flange; and the other part which bends in the direction of said one side surface of said flange at the top end thereof.

A third aspect of the invention provides a clip, wherein an anchoring part is provided at the top end of said fixing piece, which is inserted in a hole formed on said installation base member thereby anchoring the clip to the installation base member.

A fourth aspect of the invention provides a clip for mounting an installation base member of a weather strip on a flange provided along a body of an automobile, wherein said clip is composed of a fixing piece mounted on an exposed end portion of a resin insert embedded in the installation base member of said weather strip; and a pressuring piece which is rotatably or movably mounted to the fixing piece, approaches one side surface of said flange by the rotation or the movement to make an elastic contact, and holds said flange with an installation surface of said installation base member mounted on the other side surface of said flange.

A fifth aspect of the invention provides a clip, wherein said resin insert roughly forms L shape in section including: a straight part embedded along the other side surface of said flange; and a bent part which bends in the direction of said one side surface of the flange at the top end thereof wherein a top end of the bent part is exposed.

A sixth aspect of the invention provides a clip, wherein a claw which bends at a time of said elastic contact is provided at a top end of said pressuring piece.

A seventh aspect of the invention provides a mounting method of an installation base member of a weather strip on a flange provided along a body of an automobile by means of a clip composed of a fixing piece and a pressuring piece which is rotatably or movably mounted to the fixing piece, wherein the clip is mounted on the installation base member of the weather strip through the fixing piece while said pressuring piece is separated from a surface of a cabin side of said flange by said rotation or movement, an installation surface of said installation base member with said clip is mounted on a surface of an outer-cabin side of said flange, and said pressuring piece is rotated or moved to approach the surface of the cabin side of the flange thereby making an elastic contact to hold said flange with the installation surface of said installation base member.

An eighth aspect of the invention provides a mounting method of an installation base member of a weather strip embedding a resin insert of which one end is exposed on a flange provided along a body of an automobile by means of a clip composed of a fixing piece and a pressuring piece which is rotatably or movably mounted to the fixing piece, wherein the clip is mounted on one end of the resin insert exposed from the installation base member of the weather strip through the fixing piece while said pressuring piece is separated from a surface of a cabin side of said flange by said rotation or movement, an installation surface of said installation base member embedding said resin insert is mounted on a surface of an outer-cabin side of said flange, and said pressuring piece is rotated or moved to approach the surface of the cabin side of the flange thereby making an elastic contact to hold said flange with the installation surface of said installation base member.

According to the present invention, the clip for mounting the weather strip is composed of: the fixing piece mounted on the installation base member of the weather strip; and the pressuring piece which is rotatably or movably mounted to the fixing piece, approaches one side surface of the flange by the rotation or the movement to make an elastic contact, and holds the flange with the installation surface of the installation base member mounted on the other side surface of the flange.

As mentioned above, the structure of the clip is not complicated and the clip enables the weather strip to be mounted on the flange only by rotating or moving the pressuring piece of the clip so that the mounting is accomplished in a short time.

Especially, in the clip where the anchoring part is inserted in the installation base member of the weather strip, the mounting of the clip is easier. In addition, the anchoring part inserted in the installation base member pressures the installation base member to the flange side by the rotation or the movement of the pressuring piece, therefore, the clip is firmly mounted.

In addition, according to the present invention, the clip for mounting the weather strip is composed of: the fixing piece mounted on the exposed end portion of the resin insert embedded in the installation base member of the weather strip; and the pressuring piece which is rotatably or movably mounted to the fixing piece, approaches one side surface of the flange by the rotation or the movement to make an elastic contact, and holds the flange with the installation surface of the installation base member mounted on the other side surface of the flange.

As mentioned above, the structure of the clip is not complicated and the clip enables the weather strip to be mounted on the flange only by rotating or moving the pressuring piece of the clip so that the mounting operation is accomplished in a short time. Additionally, the use of the resin insert enables weight saving and recyclability.

Further, according to the mounting method of the weather strip of the present invention, the clip is mounted on the installation base member of the weather strip through the fixing piece while the pressuring piece is separated from the surface of the cabin side of the flange by the rotation or movement, therefore, the pressuring piece does not interfere the mounting. Then, the installation surface of the installation base member with the clip is mounted on the surface of the outer-cabin side of the flange, and the pressuring piece is rotated or moved to approach the surface of the cabin side of the flange thereby making the elastic contact so that the pressuring piece holds the flange with the installation surface of said installation base member, therefore, the mounting is easily accomplished in a short time.

Moreover, according the mounting method of the weather strip of the present invention, the clip is mounted on one end of the resin insert exposed from the installation base member of the weather strip through the fixing piece while the pressuring piece is separated from the surface of the cabin side of the flange by the rotation or movement, therefore, the pressuring piece does not interfere the mounting. Then, the installation surface of the installation base member with the clip is mounted on the surface of the outer-cabin side of the flange, and the pressuring piece is rotated or moved to approach the surface of the cabin side of the flange thereby making the elastic contact so that the pressuring piece holds the flange with the installation surface of the installation base member, therefore, the mounting is easily accomplished in a short time.

BRIEF DESCRIPTION OF THE DRAWINGS

FIG. 13(a) is a side view thereof; FIG. 13(b) is an oblique perspective view thereof;

FIG. 14(a) is a plain view thereof; FIG. 14(b) is an oblique perspective view thereof; FIG. 14(c) is a sectional view showing a state that the clip of FIG. 14(a) mounted on an installation base member makes an elastic contact with a flange 100;

FIG. 15(a) is a plain view thereof; FIG. 15(b) is a sectional view showing a state that the clip of FIG. 15(a) mounted on an installation base member makes an elastic contact with a flange 100;

DESCRIPTION OF PREFERRED EMBODIMENT

Figure 1:
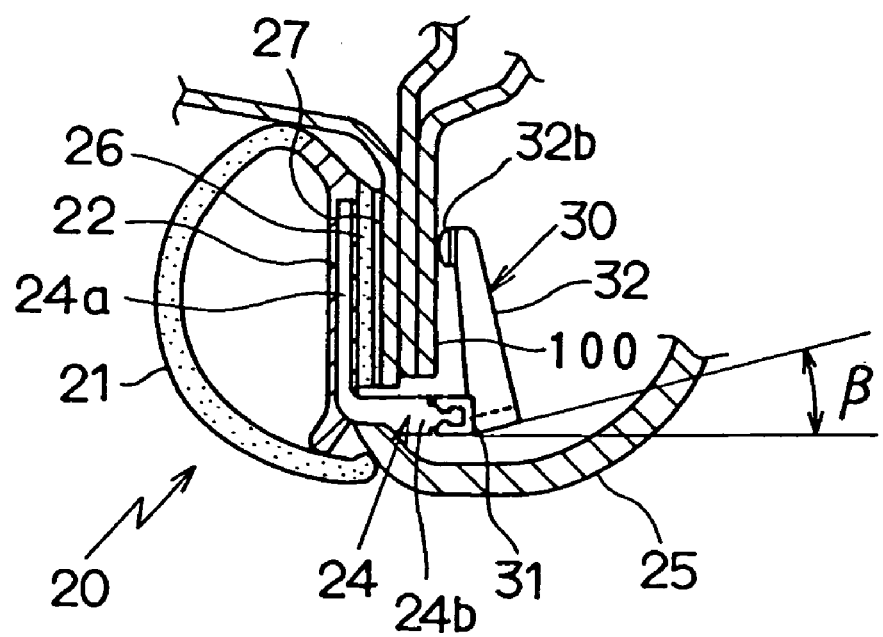
FIG. 1 is a sectional view showing a state that a clip of the present invention holds a flange.

Referring to FIGS. 1 to 4, a clip according to an embodiment of the invention and mounting method of a weather strip by means of the clip will be described.

A clip 30 is used for mounting an installation base member 22 of a weather strip 20 on a flange 100 exposed from a body of an automobile.

The weather strip 20 is composed of the installation base member 22 made of solid rubber and a hollow seal member 21 made of rubber sponge for conducting an elastic contact with a door and sealing both outer-side and inner-side of the automobile when the door (not shown) is opened or closed.

The installation base member 22 is roughly straight in section and both of end portions thereof are equipped with base roots of the hollow seal member 21. Generally, the installation base member 22 roughly forms U shape in section so as to cover the flange 100. But, the shape of the installation base member 22 of the present invention corresponds to the shape of a side surface which derives from the cross-section roughly U-shaped installation base member of which one of side surfaces and a connecting portion which connects both of the side surfaces are cut off. In the installation base member 22, protuberances 13 shown in background of the invention are not formed on an opposite side (cabin side) to a side on which the hollow seal member 21 is formed (outer-cabin side).

Figure 4:
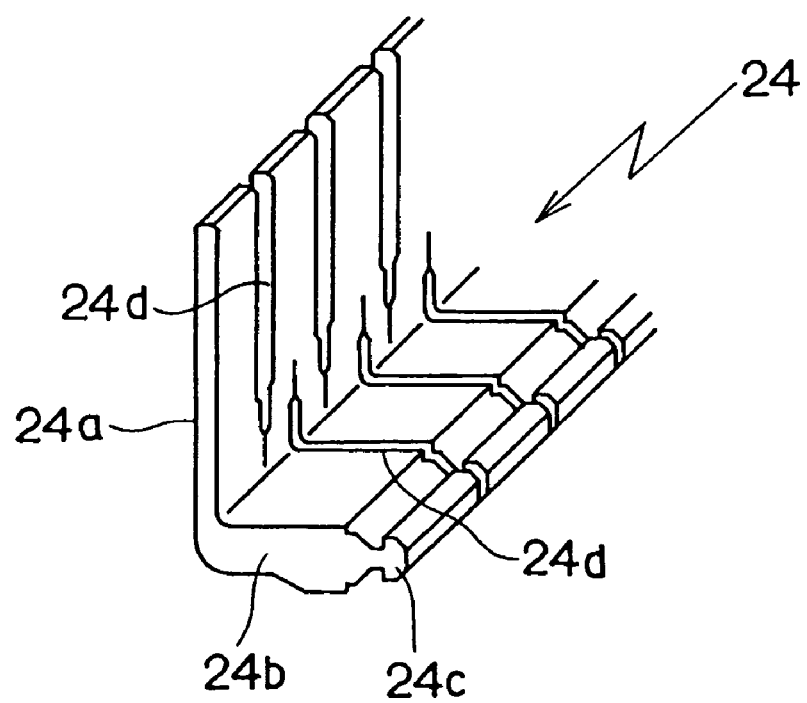
FIG. 4 is an oblique perspective view showing a part of a resin insert embedded in an installation base member of a weather strip of the present invention.

In the installation base member 22, a resin insert 24 which roughly forms L shape in section is embedded in such a manner that a part of the resin insert is exposed from the installation base member 22. The resin insert 24 includes: a straight part 24a embedded in the installation base member 22; and a bent part 24b which bends in the direction of the opposite side (cabin side) to the side on which the hollow seal member 21 is formed (outer-cabin side) from the straight part 24a, wherein the bent part 24b is exposed from the installation base member 22. In addition, an anchoring projection part 24c is provided at the top end of the bent part 24b. As shown in FIG. 4, ditches 24d are formed on the resin insert 24 at regular intervals in a longitudinal direction in which the resin insert 24 extends so that the resin insert be so flexible as to follow the flange 100 even if the flange is placed curvedly. Soft sponge 26 is provided on the cabin side of the installation base member 22 and adhesive tape 27 for mounting the flange 100 is provided on a surface of the sponge 26. The cabin side of the installation base member 22 is covered with interior material 25.

A clip 30 is mainly composed of a fixing piece 31 and a pressuring piece 32. Generally, plural clips 30 are mounted on necessary parts in a longitudinal direction in which the weather strip 20 extends.

Protuberances 31a which anchor to the anchoring projection part 24c of the resin insert 24 are formed on the interior sides of both ends of the fixing piece 31 which roughly forms U shape in section and the anchoring projection part 24c is disposed inside an opening part of the fixing piece 31 by the claw parts 31a so as to mount the fixing piece 31 on the resin insert 24.

Figure 2:
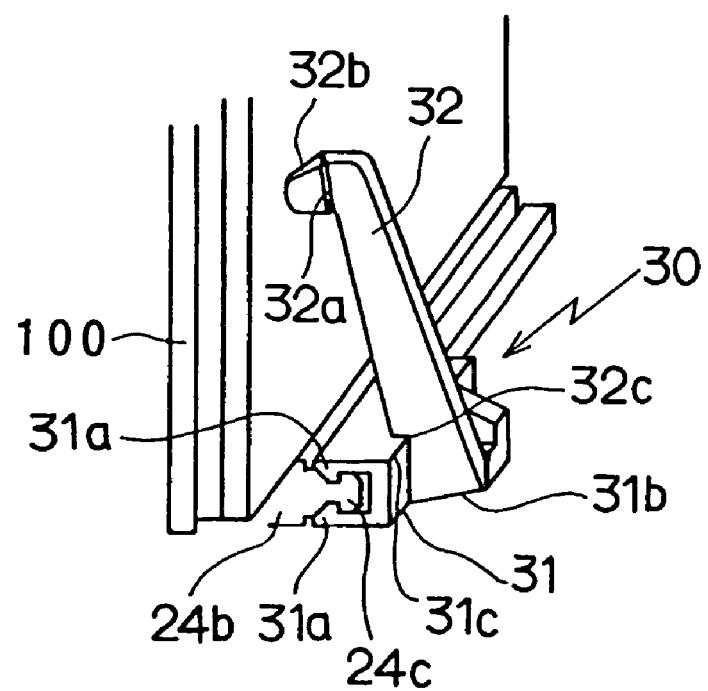
FIG. 2 is an oblique perspective view showing enlargement of important parts of FIG. 1.
Figure 3:
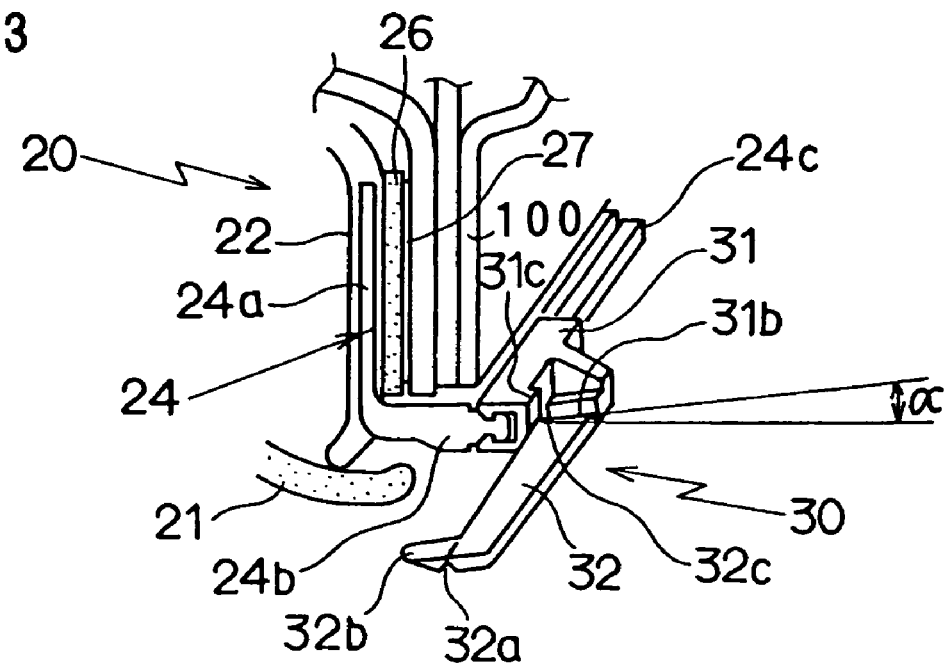
FIG. 3 is an oblique perspective view of a clip of the present invention just before holding a flange.

On the other hand, the pressuring piece 32 is mounted on the cabin side of the fixing piece 31 with a bend region 31b in the central part toward the fixing piece 31 rotatably from a level position shown in FIG. 3 (standard position) to a handstand position shown in FIG. 2 or, as the opposite direction, from the handstand position to the level position (standard position). The bend region 31b is straight and, as shown in FIG. 3, inclines α degree (0<α<90) in the direction in which the bent part 24b of the resin insert 24 extends on a level surface including the level position of the pressuring piece 32 so that the pressuring piece 32 approaches the straight part 24a of the resin insert 24 in the outer-cabin side when the pressuring piece 32 is at the handstand position. That is, the pressuring piece 32 approaches the flange 100 and makes an elastic contact with the flange 100 when the weather strip 20 is mounted on the flange 100. In the present embodiment, the straight bend region 31b inclines β degree in the direction in which the bent part 24b of the resin insert 24 extends on a perpendicular surface including the handstand position of the pressuring piece 32 as shown in FIG. 1 so that the pressuring piece 32 approaches the straight part 24a of the resin insert 24 and makes an elastic contact with the flange 100 with less rotation as compared with the case where the bend region 31b does not incline (β=0). Therefore, the pressuring piece 32 makes an elastic contact with the flange 100 even without the inclination of β degree, but it is more preferable that the bend region 31b inclines.

In addition, a claw 32b, which bends with the bend region 32a as the center when the pressuring piece 32 makes the elastic contact with the flange 100, is provided at a top end of the pressuring piece 32 as shown in FIG. 2 and FIG. 3. The claw 32b deals with variety of thickness of the flange 100. That is, a bending angle of the claw 32b is larger when the thickness of the flange 100 is thick whereas the bending angle of the claw 32b is smaller when the thickness of the flange 100 is thin. FIG. 1 and FIG. 2 show a state that the daw 32b is bent.

In addition, a cutout 32c is formed on the pressuring piece 32 and a corner part 31c of the fixing piece 31 gets caught in the cutout 32c so that the pressuring piece 32 does not go back to the prior level position (standard position) from the handstand position by reaction.

The pressuring piece 32 is rotatably mounted to the fixing piece 31 so that the pressuring piece 32 approaches one surface (cabin side) of the flange 100 by the rotation to make the elastic contact with the flange 100 thereby holding the flange 100 with an installation surface of the installation base member 22 equipped on the other surface (outer-cabin side) of the flange 100 through soft sponge 26 and adhesive tape 27.

In order to mount the weather strip 20 integrally extrusion-molded with a hollow seal member 21 and the cross-section roughly straight installation base member 22, and having the resin insert 24 embedded in the installation base member in such a manner that one end of the resin insert is exposed on the flange 100 by means of the clip composed of the above-mentioned manner, the clip 30 is mounted on one end of the resin insert 24 exposed from the installation base member 22 of the weather strip 20 through the fixing piece 31 while the pressuring piece 32 is separated from the surface of the cabin side of the flange 100 by the rotation. Plural clips 30 are partially mounted in a longitudinal direction in which the resin insert 24 extends.

Then the installation surface of the installation base member 22 embedding the resin insert 24, in another word, the installation surface positioning at the cabin side of the installation base member 22 which is roughly straight in section is equipped on the surface of the outer-cabin side of the flange 100 through the soft sponge 26 and the adhesive tape 27.

The pressuring piece 32 is rotated to approach the surface of the cabin side of the flange 100 thereby making the elastic contact with the flange 100 so as to hold the flange 100 with the installation surface of the installation base member 22 equipped through the soft sponge 26 and the adhesive tape 27 as shown in FIG. 1.

In the above-mentioned case, the bending angle of the claw 32*b* provided at a top end of the pressuring piece 32 is larger when the thickness of the flange 100 is thick whereas the bending angle of the claw 32*b* is smaller when the thickness of the flange 100 is thin. Therefore, the installation surface of the installation base member 22 and the pressuring piece 32 hold the flange 100 without fail and firmly regardless of the thickness of the flange 100.

Although in the embodiment of the present invention, the cutout 32*c* was formed on the pressuring piece 32 so that the corner part 31*c* of the fixing piece 31 got caught in the cutout 32*c* and the pressuring piece 32 would be maintained at the handstand position, the present invention is not limited to said embodiment and any structure which maintains the pressuring piece 32 at the handstand position when the pressuring piece 32 is at the handstand position is applicable. An example of the structure is that a member which anchors or fits the pressuring piece 32 into the fixing piece 31 when the pressuring piece 32 is at the handstand position is provided in the fixing piece 31 and the pressuring piece 32.

In addition, in the embodiment of the present invention, the clip 30 was mounted on the resin insert 24 by anchoring the protuberances 31*a* of the fixing piece 31 to the anchoring projection part 24*c* of the resin insert 24. But there are various methods of mounting the clip on the resin insert and the method for carrying out the invention is not limited.

Figure 5:
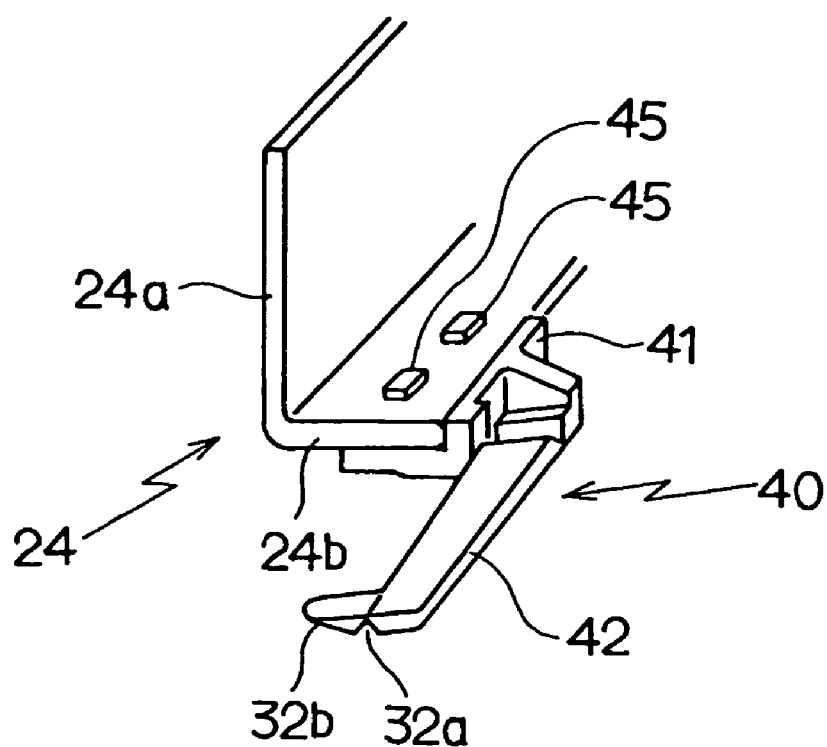
FIG. 5 is an oblique perspective view showing a state that a clip is mounted on the resin insert shown in FIG. 4 by means of staple.
Figure 6:
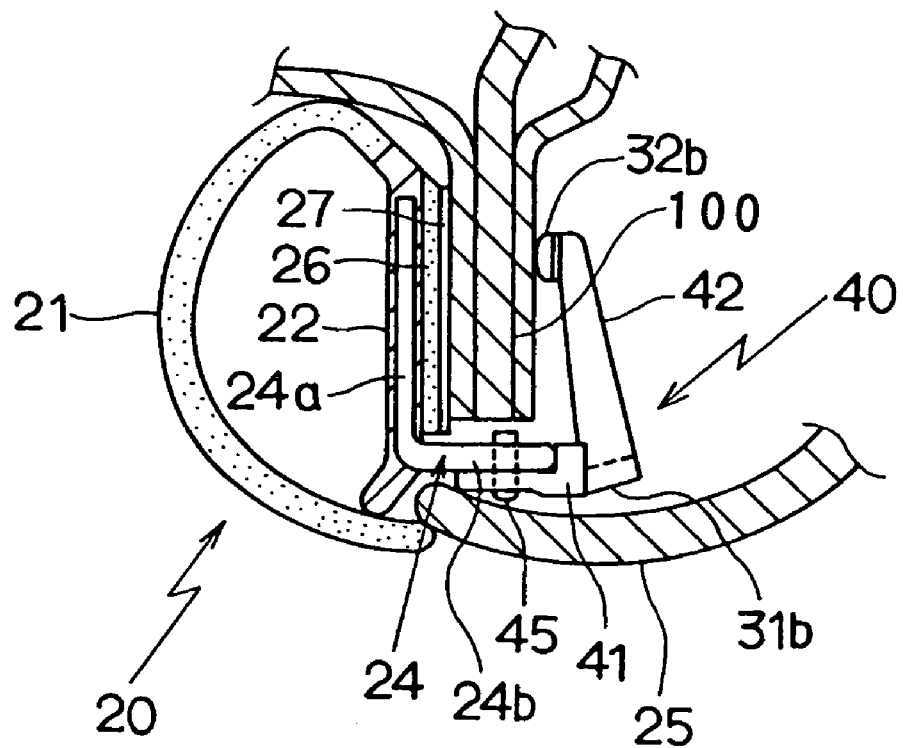
FIG. 6 is an oblique perspective view showing a state that the clip shown in FIG. 5 holds a flange.

For example, as shown in FIG. 5 and FIG. 6, the clip 40 may be mounted by applying a fixing piece 41 which roughly forms L shape in section under the bent part 24*b* of the exposed resin insert 24 and screwing the fixing piece 41 and the bent part 24*b* by means of staples 45. The structure of the pressuring piece 42 is the same as that of the pressuring piece 32. FIG. 5 shows important parts of the mounting (does not show other than the relation between the resin insert 24 and the clip 40). FIG. 6 shows a sectional shape of a weather strip 20 in a case that the clip 40 is screwed by the staples 45.

Figure 7A:
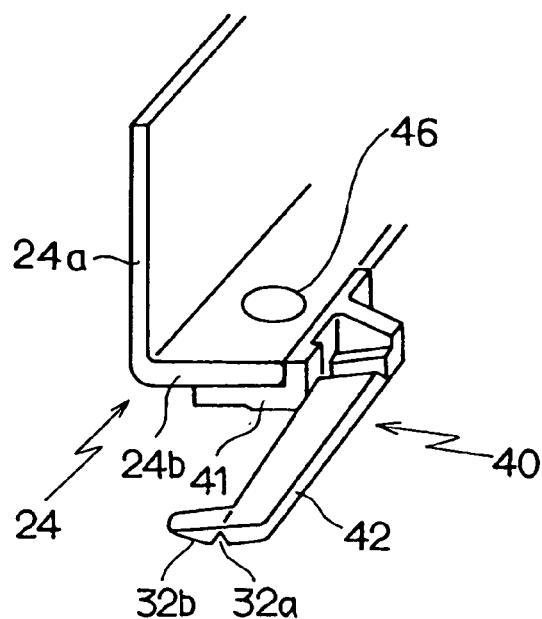
FIG. 7(a) is an oblique perspective view showing a state that a clip is mounted on the resin insert shown in FIG. 4 by means of rivet.
Figure 7B:
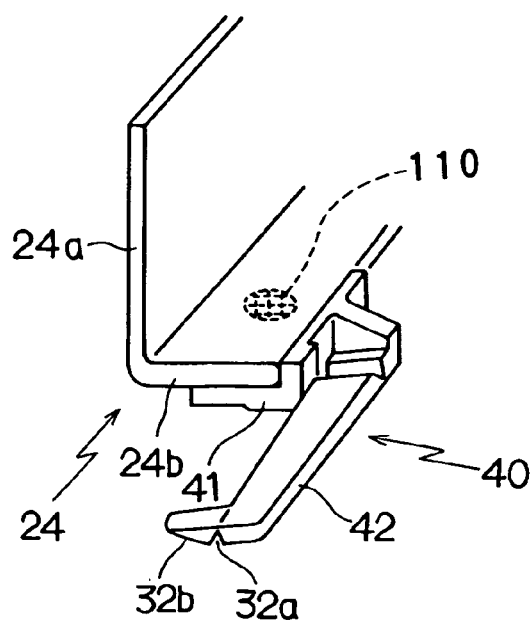
FIG. 7(b) is an oblique perspective view showing a state that a clip is mounted on the resin insert shown in FIG. 4 by means of weld.
Figure 8A:
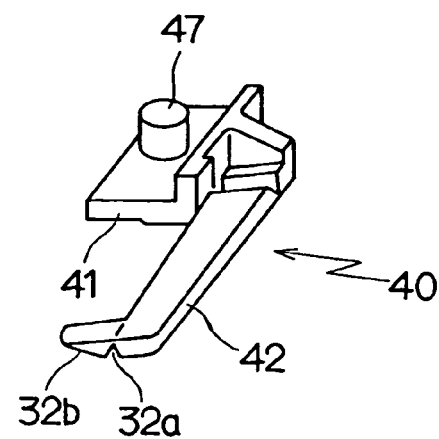
FIG. 8(a) is an oblique perspective view of a clip provided with a protruded part thereon.
Figure 8B:
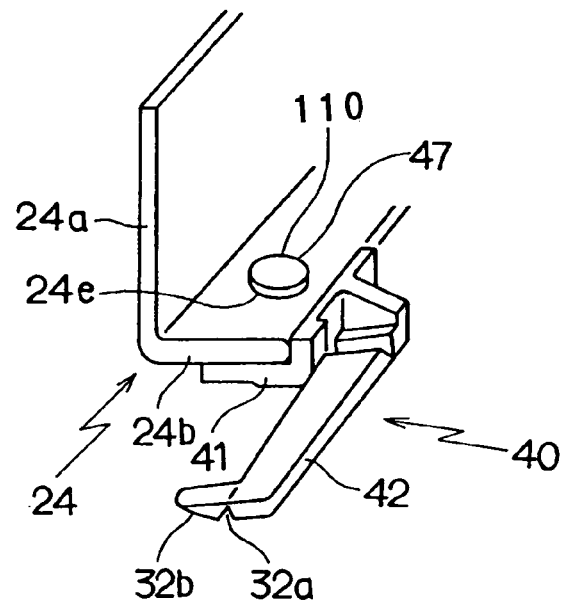
FIG. 8(b) is an oblique perspective view showing a state that the clip of FIG. 8(a) is mounted on the resin insert of FIG. 4 by means of weld.

The clip 40 and the resin insert 24 may be fastened by a rivet 46 as shown in FIG. 7(*a*), or an under surface of the bent part 24*b* of the resin insert 24 and an upper surface of the fixing piece 41 which roughly forms the L shape in section may be welded (indicated as 110) as shown in FIG. 7(*b*). Also, the fixing piece 41 which roughly forms the L shape in section is provided with a protruded part 47 while the resin insert 24 is provided with a hole 24*e* to insert the protruded part 47 therein, and then, the projecting part may be welded (indicated as 110) as shown in FIG. 8(*a*) and FIG. 8(*b*). The shape of the protruded part 47 is not limited to a circle but may be a square. The hole 24*e* may be a long hole. FIG. 7(*a*), FIG. 7(*b*), FIG. 8(*a*) and FIG. 8(*b*) show the relation between the resin insert 24 and the clip 40 as the important parts of the mounting and do not show other than the important parts.

Figure 9A:
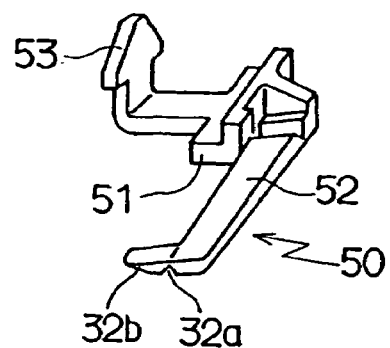
FIG. 9(a) is an oblique perspective view of an insertion-type clip.
Figure 9B:
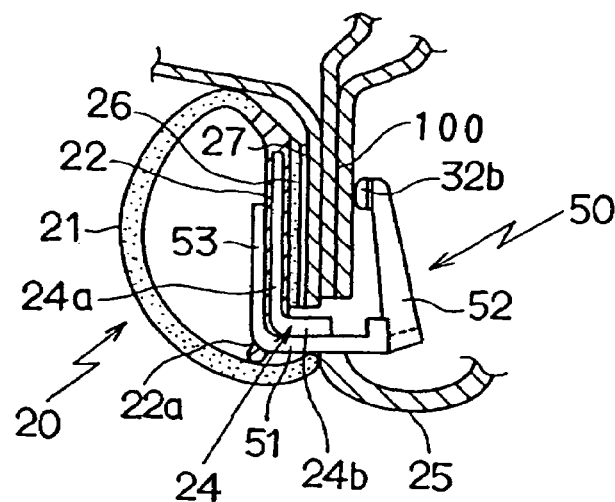
FIG. 9(b) is a sectional view showing a state that the clip of FIG. 9(a) holds a flange.

An anchoring part 53 may be provided at the top end of the fixing piece 51 which roughly forms the L shape in section in the same direction as the pressuring piece 52 does a handstand as shown in FIG. 9(*a*) to be inserted in the hole 22*a* on the installation base member 22 thereby anchoring the clip 50 to the installation base member 22 as shown in FIG. 9(*b*).

Figure 10A:
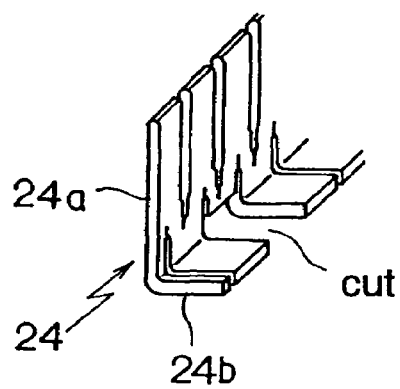
FIG. 10(a) is an oblique perspective view of a resin insert which is partially cut.
Figure 10B:
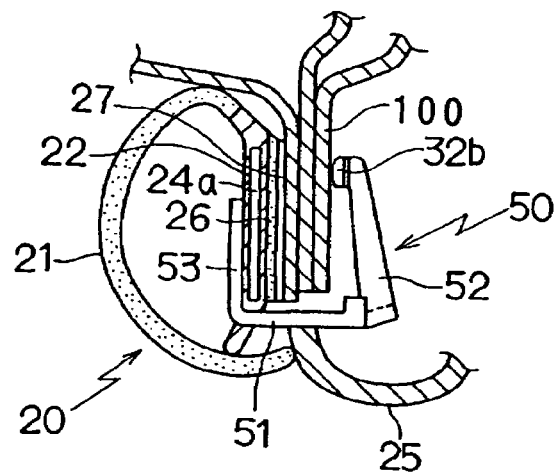
FIG. 10(b) is a sectional view showing a state that the resin insert of FIG. 10(a) and the clip of FIG. 9(a) hold a flange.

In the above-mentioned case, in order to prevent interference of the interior material 25, a part of the resin insert 24 may be cut off so that the surface of the resin insert 24 and the surface of the inserted clip 50 become uniform as shown in FIG. 10(*a*) and FIG. 10(*b*).

Figure 11:
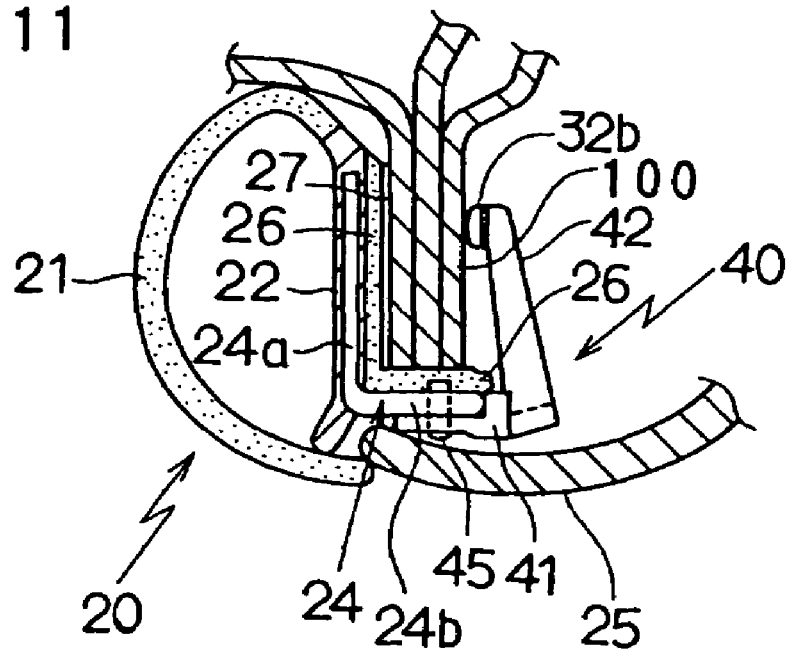
FIG. 11 is a sectional view showing a state that soft sponge is elongated.
Figure 16:
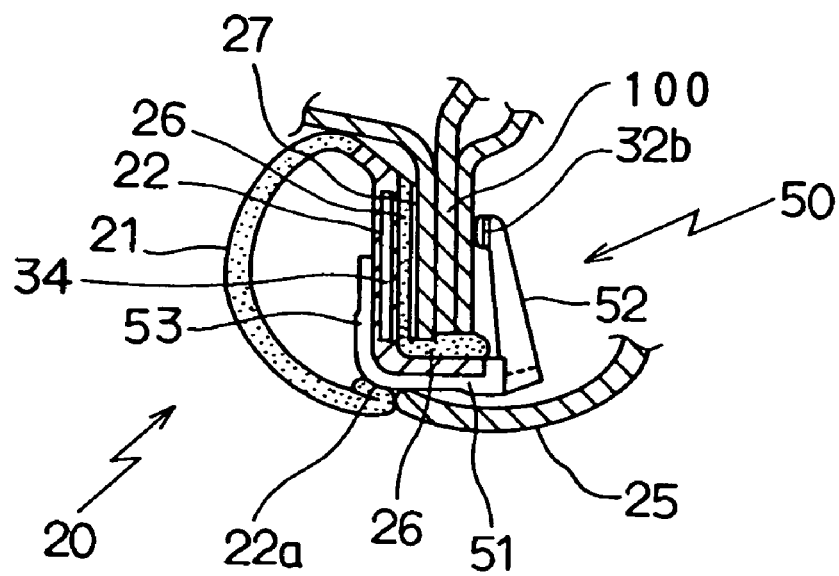
FIG. 16 is a sectional view showing a state that a soft sponge is elongated and a plate-like resin insert is embedded in an installation base member.
Figure 17:
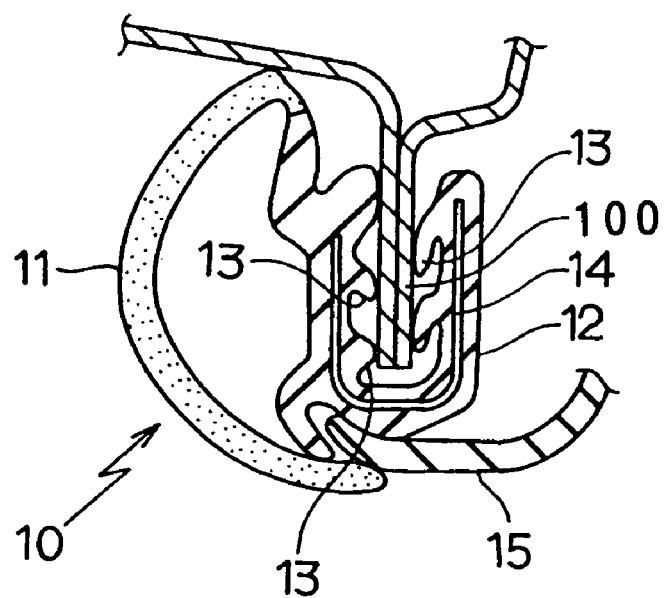
FIG. 17 is a sectional view showing a mounting method of a weather strip of a prior art.
Figure 18:
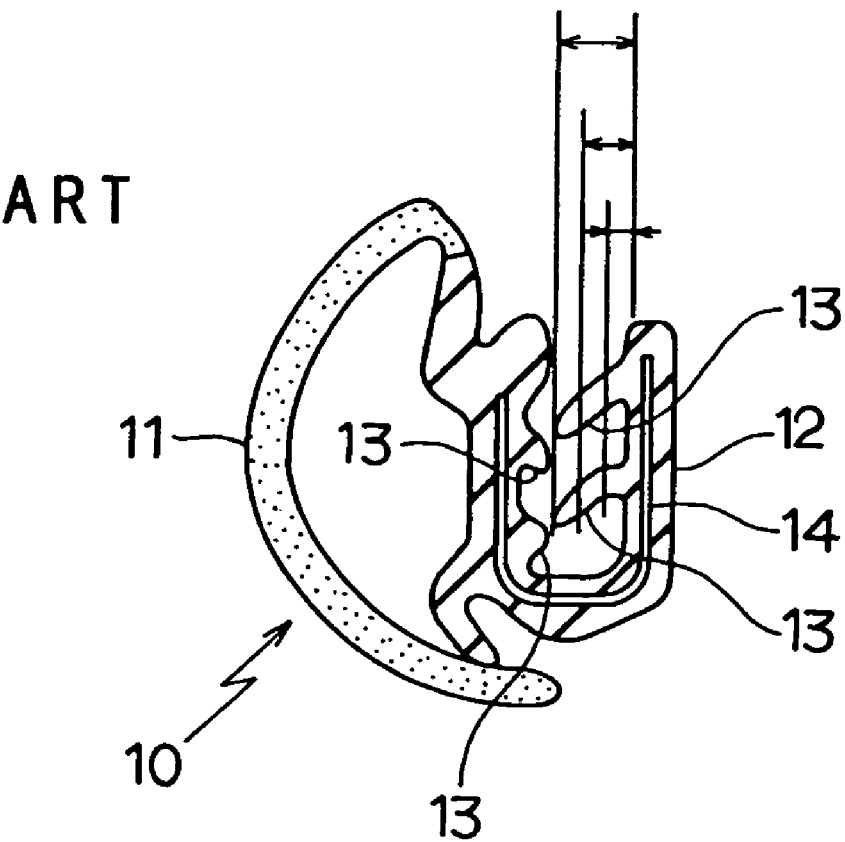
FIG. 18 is a sectional view showing the weather strip shown in FIG. 17.

The top end of the flange 100 may be covered and sealed with an elongated part of the soft sponge 26 by elongating the soft sponge 26 equipped on the installation surface of the installation base member 22 to the top end side of the flange 100 so that the soft sponge 26 roughly forms L shape in section as shown in FIG. 11. There was used the resin insert 24 which roughly formed L shape in section but a plate-like resin insert 34 as shown in FIG. 16 may also be used. In the afore-mentioned case, the resin insert 34 is completely embedded in the installation base member 22 without exposing either end thereof and roughly in parallel with the installation surface of the installation base member 22 positioning at the outer-cabin side. The clip 50 is fixed to the installation base member 22 by inserting the anchoring part 53 in the hole 22*a* on the installation base member 22.

Figure 12:
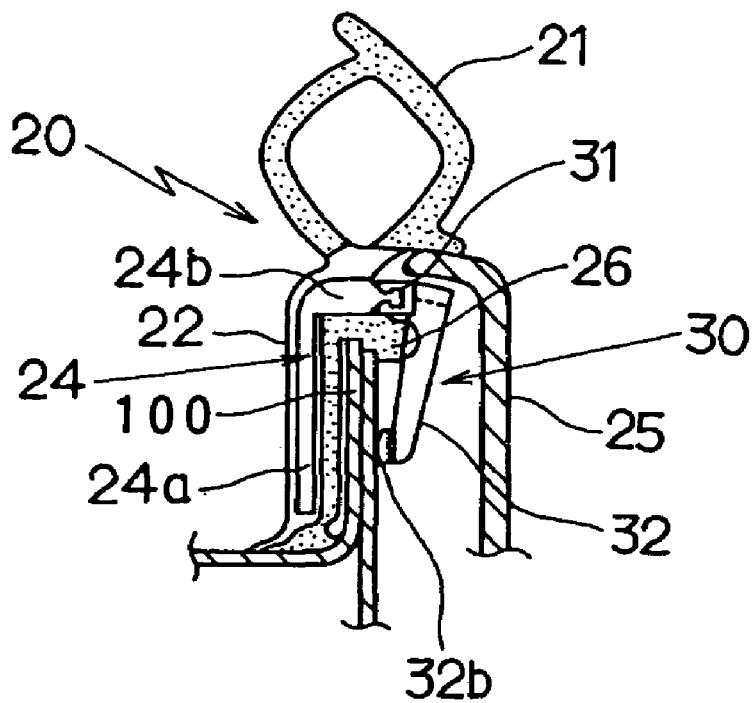
FIG. 12 is a sectional view showing a state that a weather strip is mounted on a flange of a trunk.

Although in the embodiment of the present invention, method of mounting the weather strip 20 on the flange 100 provided along a flank side of a body was explained, the invention can be applied for mounting the weather strip 20 on the flange 100 provided along a trunk as shown in FIG. 12.

Figure 13A:
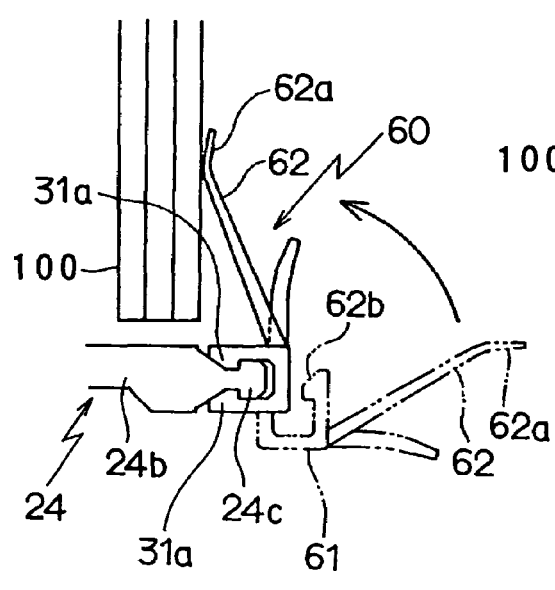
FIG. 13(a) and FIG. 13(b) show a state that a clip of the present invention, having another shape, is mounted on a resin insert.
Figure 13B:
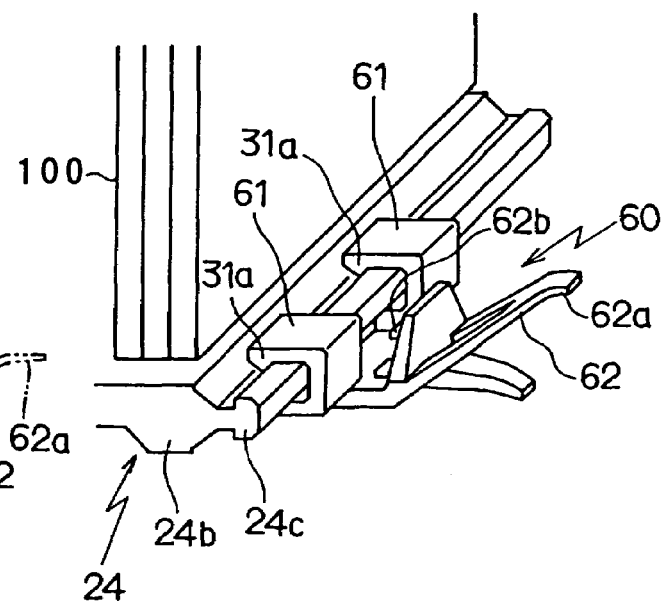

Although in the embodiment of the present invention, the pressuring pieces 32, 42, and 52 of the clips 30, 40, and 50 were rotated in the direction slanting from vertical direction to the surface of the cabin side of the flange 100 so as to make the elastic contact, the pressuring piece may be rotated in the vertical direction to the surface of the cabin side of the flange 100 so as to make the elastic contact as shown in FIG. 13(*a*) and FIG. 13(*b*). FIG. 13(*a*) and FIG. 13(*b*) show the relations between the flange 100, the resin insert 24, and the clip 60 as the important parts of the mounting and do not show other than the important parts.

In a fixing piece 61 of a clip 60, protuberances 31*a* which anchor the anchoring projection part 24*c* of the resin insert 24 are formed on the interior sides of both end portions of the fixing piece 61 which roughly forms U shape in section. The fixing piece 61 is mounted on the resin insert 24 in such a manner that the anchoring projection part 24*c* is disposed inside an opening part of the fixing piece 61 by the anchor. Two fixing pieces 61 are arranged with an interval between the two. A pressuring piece 62 is connected between the two fixing pieces 61 rotatably. The pressuring piece 62 is rotated in the vertical direction to the surface of the cabin side of the flange 100. A top end part 62*a* which has elasticity for making the elastic contact with the surface of the cabin side of the flange 100 is formed on the pressuring piece 62. In order to maintain the handstand position where the pressuring piece 62 makes the elastic contact with the flange 100, protuberances 62*b* having the same shape as the protuberances 31*a* are formed on base root of the pressuring piece 62 so that the protuberances 62*b* anchor to the anchoring projection part 24*c* of the resin insert 24. In the afore-mentioned case, the elasticity of the top end part 62*a* formed on the pressuring piece 62 deals with the variety of the thickness of the flange 100.

Figure 14A:
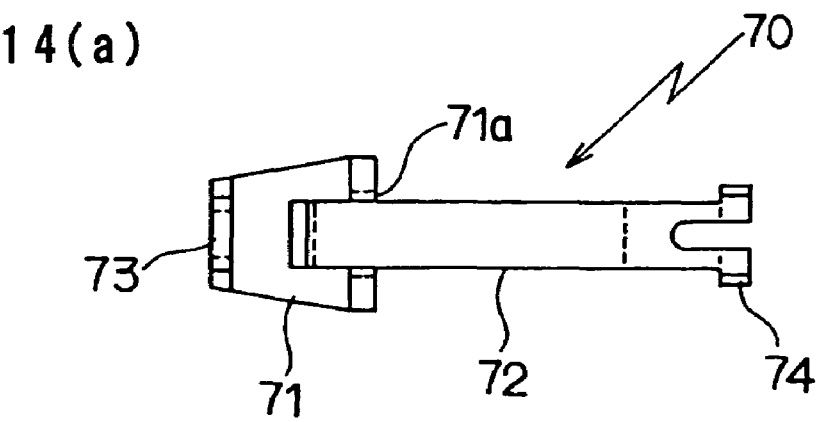
FIG. 14(a), FIG. 14(b) and FIG. 14(c) show a clip of the present invention, having still another shape.
Figure 14B:
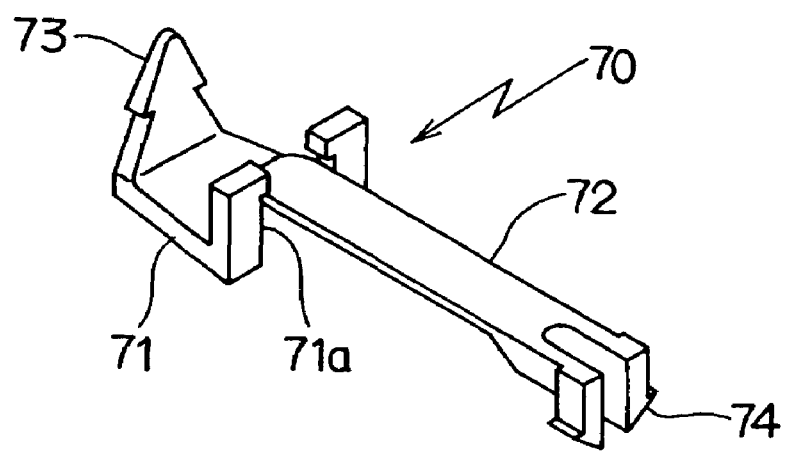
Figure 14:
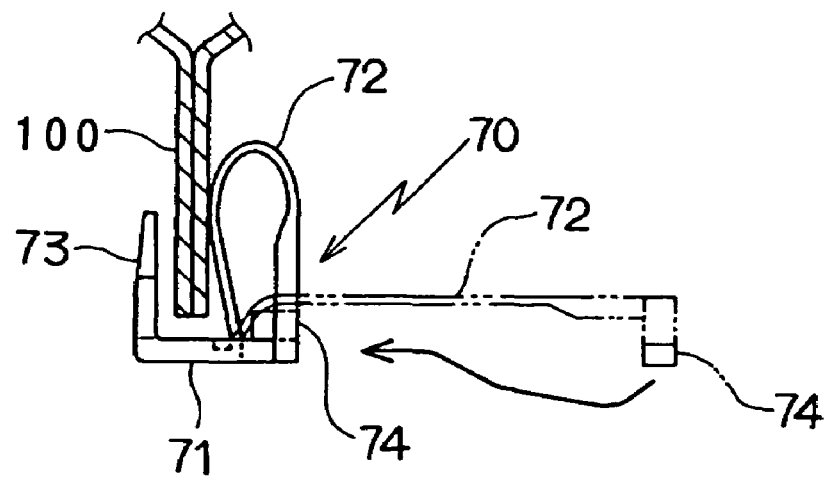

Another example of a usable clip 70 is shown in FIG. 14(*a*), FIG. 14(*b*) and FIG. 14(*c*) and the structure thereof is as follows. The top end of the fixing piece 71 which roughly forms L shape in section is provided with an anchoring part 73 to be inserted in the hole 22a formed on the installation base member 22 for anchoring in the same manner as FIG. 9(a) and FIG. 9(b) while the bottom end of the fixing piece 71 is provided with one end of a thin belt-shaped pressuring piece 72 composed of an elastic member so that an anchoring part 74 provided on the other end of the pressuring piece 72 is anchored to a concave part 71a formed on the bottom end of the fixing piece 71, the belt-shaped pressuring piece 72 is curved to form a deformed ring shape (oval shape) shown in FIG. 14(c), and the curved part makes the elastic contact with the surface of the cabin side of the flange 100. FIG. 14(c) shows the relation between the flange 100 and the clip 70 as the important part of the mounting and does not show other than the important part. In the afore-mentioned case, the elasticity of the curve of the pressuring piece 72 deals with the variety of the thickness of the flange 100. The curved shape is maintained by anchoring the anchoring part 74 of the pressuring piece 72 to the concave part 71a of the fixing piece 71.

Figure 15A:
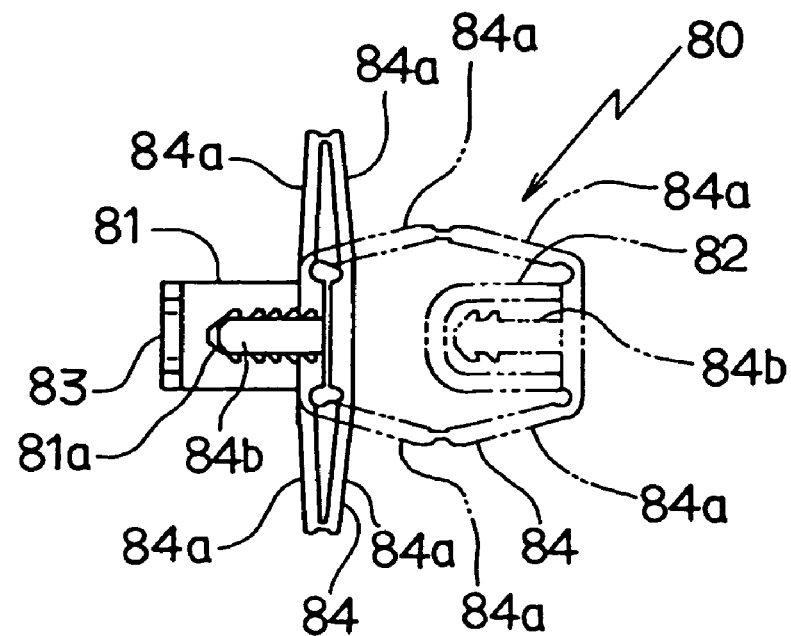
FIG. 15(a) and FIG. 15(b) show a clip of the present invention, having still another shape.
Figure 15B:
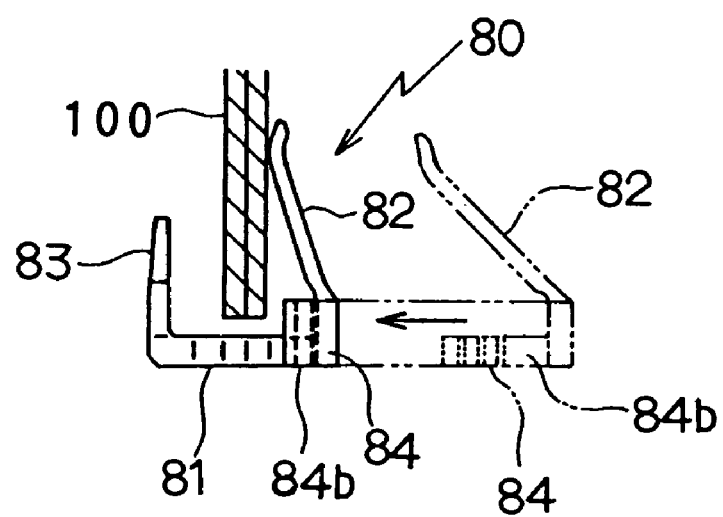

Still another example of a usable clip 80 is shown in FIG. 15(a) and FIG. 15(b) and the structure thereof is as follows. The top end of the fixing piece 81 which roughly forms L shape in section is provided with an anchoring part 83 to be inserted in the hole 22a formed on the installation base member 22 for anchoring in the same manner as FIG. 9(a) and FIG. 9(b) while the bottom end of the fixing piece 81 is provided with a contractible connection member 84 having a pressuring piece 82 so that the pressuring piece 82 makes the elastic contact with the surface of the cabin side of the flange 100 when the connection member 84 contracts. FIG. 15(b) shows the relation between the flange 100 and the clip 80 as the important part of the mounting and does not show other than the important part. The connection member 84 is composed of: a link mechanism which is a union of four bars 84a and is contractible in the vertical direction to the surface of the cabin side of the flange 100; an anchoring part 84b provided on the link mechanism; and a pressuring piece 82 installed on the bottom end of the anchoring part 84b. A concave part 81a which guides the anchoring part 84b is formed on the bottom end of the fixing piece 81 so that the link bars 84a contracts when the anchoring part 84b is guided by the concave part 81a, the pressuring piece 82 straightly moves and approaches the surface of the cabin side of the flange 100 to make the elastic contact with the surface of the cabin side of the flange 100. In the aforementioned case, the elasticity of the tope end of the pressuring piece 82 deals with the variety of the thickness of the flange 100. The curved shape of the pressuring piece 82 is maintained by anchoring the anchoring part 84b of the connection member 84 connected to the pressuring piece 82 to the concave part 81a of the fixing piece 81.

In the embodiment of the present invention, the clip was mounted on the resin insert 24 while the clip may also be mounted on the metal insert. But the use of the resin insert 24 is more preferable for the purpose of weight saving and recyclability.

The clip is not necessarily mounted on the insert but may also be mounted directly on the installation base member.

For instance, an installation base member may roughly form L shape in section including: a part formed along the surface of the outer-cabin side of the flange 100; and the other part which bends in the direction of the surface of the cabin side of the flange 100 at the top end of the flange 100. The fixing piece of the clip is mounted on the bent part and the pressuring piece is rotated or moved so that the pressuring piece makes an elastic contact with the surface of the cabin side of the flange 100.

In the afore-mentioned case, the mounting method is as follows: the clip is mounted on the installation base member 22 of the weather strip 20 through the fixing piece while the pressuring piece is separated from the surface of the cabin side of said flange 100 by the rotation or the movement, the installation surface of the outer-cabin side of the installation base member 22 with said clip is mounted on the surface of the outer-cabin side of the flange 100, and the pressuring piece is rotated or moved to approach the surface of the cabin side of the flange 100 thereby making the elastic contact so as to hold the flange 100 with the installation surface of the outer-cabin side of the installation base member 22.

In the embodiment of the present invention, the installation surface of the installation base member 22 of the weather strip 20 was equipped on the opposite side of the side surface of the flange 100 on which the pressuring piece makes the elastic contact, in another word, on the surface of the outer-cabin side of the flange 100, through the soft sponge 26 and the adhesive tape 27. But the present invention is not limited to the structure. For instance, a projection or a lip which makes the elastic contact with the flange 100 may be provided on the installation surface of the installation base member 22 of the weather strip 20 equipped on the surface of the outer-cabin side of the flange 100 to hold the flange 100 with the elastic contact of the pressuring piece.

As shown in the above-mentioned embodiments of the present invention, various kinds of the clip are usable. Fundamentally, any clip keeping the structure that the pressuring piece is rotatably or straight-movably mounted to the fixing piece, the pressuring piece approaches the surface of the cabin side of the flange 100 by the rotation or the movement to make the elastic contact with the surface of the cabin side, and the pressuring piece holds the flange 100 with the installation surface of the installation base member 22 on the opposite side (outer-cabin side) of the flange 100 is usable.

We claim:

1. A clip for mounting an installation base member of a weather strip on a flange provided along a body of an automobile, wherein said clip comprises:
   a fixing piece mounted on an installation base member of said weather strip; and
   a pressuring piece which is rotatably or movably mounted to the fixing piece, approaches one side surface of said flange by the rotation or the movement to make an elastic contact, and holds said flange with an installation surface of said installation base member mounted on the other side surface of said flange.

2. A clip as claimed in claim 1, wherein:
   said installation base member roughly forms an L shape in section, and includes:
   one part formed along the other side surface of said flange; and
   another part which bends in the direction of said one side surface of said flange at the top end thereof.

3. A clip as claimed in claim 2, wherein:
   an anchoring part is provided at the top end of said fixing piece, which is inserted in a hole formed on said installation base member, thereby anchoring the clip to the installation base member.

4. A clip as claimed in claim 3, wherein a claw which bends at a time of said elastic contact is provided at a top end of said pressuring piece.

5. A clip as claimed in claim 2, wherein a claw which bends at a time of said elastic contact is provided at a top end of said pressuring piece.

6. A clip as claimed in claim 1, wherein:
an anchoring part is provided at the top end of said fixing piece, which is inserted in a hole formed on said installation base member, thereby anchoring the clip to the installation base member.

7. A clip as claimed in claim 6, wherein a claw which bends at a time of said elastic contact is provided at a top end of said pressuring piece.

8. A clip as claimed in claim 1, wherein a claw which bends at a time of said elastic contact is provided at a top end of said pressuring piece.

9. A clip for mounting an installation base member of a weather strip on a flange provided along a body of an automobile, wherein said clip comprises:
a fixing piece mounted on an exposed end portion of a resin insert embedded in the installation base member of said weather strip; and
a pressuring piece which is rotatably or movably mounted to the fixing piece, approaches one side surface of said flange by the rotation or the movement to make an elastic contact, and holds said flange with an installation surface of said installation base member mounted on the other side surface of said flange.

10. A clip as claimed in claim 9, wherein:
said resin insert roughly forms an L shape in section, and includes:
a straight part embedded along the other side surface of said flange; and
a bent part which bends in the direction of said one side surface of the flange at the top end thereof wherein a top end of the bent part is exposed.

11. A clip as claimed in claim 10, wherein a claw which bends at a time of said elastic contact is provided at a top end of said pressuring piece.

12. A clip as claimed in claim 9, wherein a claw which bends at a time of said elastic contact is provided at a top end of said pressuring piece.

13. A mounting method of an installation base member of a weather strip on a flange provided along a body of an automobile by means of a clip comprising a fixing piece and a pressuring piece which is rotatably or movably mounted to the fixing piece, wherein:
the clip is mounted on the installation base member of the weather strip through the fixing piece while said pressuring piece is separated from a surface of a cabin side of said flange by said rotation or movement, an installation surface of said installation base member with said clip is mounted on a surface of an outer-cabin side of said flange, and
said pressuring piece is rotated or moved to approach the surface of the cabin side of the flange, thereby making an elastic contact to hold said flange with the installation surface of said installation base member.

14. A mounting method of an installation base member of a weather strip embedding a resin insert of which one end is exposed on a flange provided along a body of an automobile by means of a clip comprising a fixing piece and a pressuring piece which is rotatably or movably mounted to the fixing piece, wherein:
the clip is mounted on one end of the resin insert exposed from the installation base member of the weather strip through the fixing piece while said pressuring piece is separated from a surface of a cabin side of said flange by said rotation or movement,
an installation surface of said installation base member embedding said resin insert is mounted on a surface of an outer-cabin side of said flange, and
said pressuring piece is rotated or moved to approach the surface of the cabin side of the flange, thereby making an elastic contact to hold said flange with the installation surface of said installation base member.

* * * * *